United States Patent [19]

Needham

[11] Patent Number: 5,530,055
[45] Date of Patent: Jun. 25, 1996

[54] NUCLEATED POLYOLEFIN-BASED COMPOSITION FOR ROTATIONAL MOLDING

[76] Inventor: Donald G. Needham, Rte. 1, Box 300, Ramona, Okla. 74061

[21] Appl. No.: 352,548

[22] Filed: Dec. 9, 1994

[51] Int. Cl.⁶ .............................. C08L 23/04; C08K 3/30; C08K 3/04; C08K 3/22
[52] U.S. Cl. .................. 524/528; 524/407; 524/413; 524/423; 524/425; 524/430; 524/431; 524/432; 525/240; 264/310
[58] Field of Search ........................... 525/240; 524/528, 524/407, 423, 413, 425, 430

[56] References Cited

U.S. PATENT DOCUMENTS

| | | | |
|---|---|---|---|
| 2,991,264 | 7/1961 | Clarke et al. | 260/32.6 |
| 3,876,613 | 4/1975 | Needham et al. . | |
| 4,243,619 | 1/1981 | Fraser et al. | 264/40.6 |
| 4,267,080 | 5/1981 | Yokoyama et al. . | |
| 4,275,168 | 6/1981 | Watanabe et al. . | |
| 4,374,227 | 2/1983 | Michie | 524/528 |
| 4,900,792 | 2/1990 | Chen et al. . | |
| 5,082,902 | 1/1992 | Gurevitch et al. | 525/240 |
| 5,366,675 | 11/1994 | Needham . | |

FOREIGN PATENT DOCUMENTS

| | | |
|---|---|---|
| 60177046 | 9/1995 | Japan . |
| 93/00400 | 1/1993 | WIPO . |

*Primary Examiner*—Carman J. Seccuro, Jr.
*Attorney, Agent, or Firm*—Timothy R. Kroboth

[57] ABSTRACT

A polyolefin-based composition useful for rotational molding, is provided. A polyethylene resin blend is beneficially used. The composition advantageously includes a nucleating agent. Rotomolded containers having improved resistance to puncture are beneficially provided. Also provided is a method of rotomolding the composition.

9 Claims, No Drawings

NUCLEATED POLYOLEFIN-BASED COMPOSITION FOR ROTATIONAL MOLDING

FIELD OF THE INVENTION

This invention relates to thermoplastic polymers of ethylene suitable for fabrication into useful products by rotational molding.

BACKGROUND OF THE INVENTION

Rotational molding, more commonly known as rotomolding, is widely used for molding hollow articles, and can be used to mold very large containers and tanks of more than 2000 gallons. To rotomold a part, a powdered resin is charged inside a mold shell, which is then rotated on two axes and heated inside an oven to cause the resin to adhere to the inside of the mold. After sufficient heating time, the mold is moved to a cooling chamber, and after cooling, the molded part is removed to begin another molding cycle. A more detailed discussion of rotomolding may be found in *Modern Plastics Encyclopedia* 1990, pages 317–318.

Rotational molding primarily uses polyolefin resins, with thermoplastic polymers of ethylene being principally used. Key properties for rotationally molded parts include appearance, and especially in the case of containers, resistance to puncture or rupture. It is essential for the resin, which is generally used in a powdered form of 35 mesh, to have sufficient melt flow to capture the texture and detail of the mold, and also to adhere quickly to the heated mold to reduce cycle time. A difficulty is that as melt flow increases, resistance to puncture or rupture, as measured for instance by impact strength, decreases, making it necessary to compromise the impact strength to obtain a good appearance on the outside of the molded part.

By comparison, in compression-molding, sufficient impact strength may be obtained to prevent puncture or rupture. However, rotomolding does not permit the application of pressure available in compression molding. Moreover, in compression molding, fractional melt index resins which have a higher molecular weight and a higher impact strength, may be used.

A useful additive for seeding crystals is a nucleating agent. Use of a nucleating agent for controlling foam cell structure in a foamable polyethylene-based composition during rotational molding, is described in U.S. Pat. No. 5,366,675 to Needham. Typically, a nucleating agent remains solid and is usually finely powdered. Nucleating agents include calcium carbonate; zinc oxide; pigments such as carbon black and titanium dioxide; and silicates such as kaolins, mica, talc, aluminum silicate, magnesium silicate, and calcium silicate. However, it is known that nucleating agents generally produce stiffer resins and consequently lower impact strength.

A problem with containers formed by rotational molding of commercially available, polyolefin-based compositions, is the tendency of the container wall to puncture or otherwise rupture, upon impact by a sharp object, for instance, a fork of a forktruck. Accordingly, there is a need for a polyolefin-based composition of improved impact strength, suited for rotomolding applications, and yet that has sufficient melt flow to capture the texture and detail of the mold.

SUMMARY OF THE INVENTION

In accordance with the present invention, a nucleated polyolefin-based composition and a method of rotomolding the composition, are provided. Polyethylene resin suitable for rotational molding is generally a medium density resin. A polyethylene resin blend is beneficially selected for use in the invention. As indicated, the composition advantageously includes a nucleating agent.

Beneficially, a polyethylene resin blend in accordance with the present invention, includes a major portion of a medium density resin having a melt index of from about 3 to 8 gm/10 min, and a minor portion of a linear low density resin having a melt index of no more than about 12 gm/10 min. Especially beneficial is a resin blend additionally containing a minor portion of a high density/high melt index resin. Remarkably, increased impact strength is found in polyethylene resin blends in accordance with the present invention, to which a nucleating agent is added.

DETAILED DESCRIPTION OF THE INVENTION

As indicated, the present invention relates to a nucleated polyolefin-based composition, and to a method of rotomolding hollow articles from the composition. In accordance with the invention, hollow articles having significantly improved resistance to puncture or rupture are advantageously provided. Beneficially, a polyolefin-based composition in accordance with the present invention, has sufficient melt flow to capture the texture and detail of the mold.

Polymers useful in this invention include thermoplastic polymers of ethylene. As indicated, a resin blend is essential, and as may be understood, compatibility of the components of the resin blend is important. Particularly suitable constituents of a polyethylene resin blend in accordance with the present invention, include ethylene homopolymers and ethylene copolymers comprised of a major part of ethylene monomer. A typical ethylene copolymer will usually contain at least about 75% by weight of ethylene monomer. Useful monomers for a minor part of ethylene copolymer typically include a C3–C8 alpha-olefin, typically an acyclic straight or branched chain olefin such as butene, hexene and octene.

Use of polyethylene homopolymer and of ethylene copolymer compositions for rotomolding applications, is well known, as illustrated in U.S. Pat. Nos. 3,876,613, 5,260,381, 5,367,025 and 5,366,675 to Needham. In these polyethylene resins, a crosslinking agent or foaming agent is incorporated. However, a crosslinking agent would not be used in a polyolefin-based composition in accordance with the present invention.

An essential component of a polyethylene resin blend in accordance with the present invention, is a medium density polyethylene. A suitable density of this component is typically in the range of about 0.93 to 0.945, preferably about 0.935 to 0.94 gm/cc, as determined by ASTM 1505. Generally speaking, a relatively lower density within the foregoing range may be provided by use of a relatively higher level of a co-monomeric alkene.

Beneficially, a useful medium density polyethylene has a melt index of from about 3 to 8, preferably about 3 to 5, gm/10 minutes as determined by ASTM D1238, condition "E". If the melt index is too high, then the rotomolded part will lack adequate impact strength and elongation. Melt index is inversely related to molecular weight.

Exemplary suitable medium density polyethylenes include ethylene-hexene copolymers having a density of 0.938 gm/cc and a melt index of 3.9 gm/10 min and available as Phillips TR938, and having a density of 0.939 gm/cc and a melt index of 3.6 gm/10 and available as Esso 8460.

Advantageously, a polyethylene resin blend in accordance with the present invention, contains a major part of the medium density polyethylene. A typical polyethylene resin blend will usually contain at least about 65%, preferably at least about 75%, by weight of the medium density polyethylene.

A second essential component of a polyethylene resin blend in accordance with the present invention, is a linear low density polyethylene (LLDPE). Such a polymer is termed "linear" because of the substantial absence of branched chains of polymerized monomeric units pendant from the main polymer "backbone". As indicated, the linear polymer may be the copolymer of ethylene and minor amounts of alkenes having beneficially from about 3 to 8 carbons per alkene molecule. In such case, the amount of the alkene co-monomer will be generally sufficient to provide the polymer with a density in the density range of LDPE. A useful LLDPE polymer will typically have a density in the range of about 0.915 to 0.925 gm/cc, preferably about 0.920 gm/cc. The density will also depend in part, on the particular alkene comonomer(s) selected. A particularly useful alkene is hexene, in particular 1-hexene.

A useful LLDPE polymer will generally have a melt index in the range of about 0.5 to 12 gm/10 min, preferably about 0.8 to 2 gm/10 min for improved elongation. A melt index in excess of about 12 gm/10 min will be disadvantageous relative to elongation. As may be understood, the preferred melt index is lower than the melt index of a useful medium density polyethylene. Generally speaking, density is more critical than melt index in the case of a useful LLDPE polymer.

Exemplary suitable LLDPE polymers include ethylene-hexene copolymers having a density of 0.918 gm/cc and a melt index of 1 gm/10 min and available as Novacor 0118, a density of 0.918 gm/cc and a melt index of 2 gm/10 min and available as Novacor 0218, a density of 0.918 gm/cc and a melt index of 11 gm/10 min and available as Novacor 8111, and a density of 0.921 gm/cc and a melt index of 0.8 gm/10 min and available as Novacor 821N.

Beneficially, a polyethylene resin blend in accordance with the present invention, also contains a high density polyethylene. A suitable density of this component is typically in the range of about 0.95 to 0.965 gm/cc. Beneficially, a useful high density polyethylene has a melt index of from about 15 to 30 gm/10 min. A melt index less than about 15 gm/10 min will be disadvantageous. As may be understood, the level of this component may be used to adjust the melt index of the blend.

As indicated, the high density polyethylene may be the copolymer of ethylene and minor amounts of alkenes having beneficially at least about 3 carbons per alkene molecule. Generally speaking, a relatively lower density within the foregoing range may be provided by use of a relatively higher level of the co-monomeric alkene. A particularly useful alkene is octene, especially 1-octene. A copolymer of ethylene including hexene comonomer, has been found to be unsatisfactory.

Exemplary suitable high density polyethylenes include ethylene-octene copolymers having a density of 0.953 gm/cc and a melt index of 20 gm/10 min and available as Novacor 2710, having a density of 0.960 gm/cc and a melt index of 18 gm/10 min, and having a density of 0.962 gm/cc and a melt index of 25 gm/10 min and available as Novacor 2910. Novacor 2910 was found to provide better tensile strength and elongation than Novacor 2710.

Advantageously, a polyethylene resin blend in accordance with the present invention, contains a minor part of the LLDPE polymer and high density polyethylene. Thus, a typical polyethylene resin blend will contain from about 5 to 20%, preferably from about 7.5 to 12.5%, by weight of each of these components.

As indicated, the polyethylene resin blend may contain the LLDPE polymer but not the high density polyethylene. In such case, significantly improved elongation and tensile strength at break are found compared to either the medium density polyethylene or LLDPE polymer by itself. However, in order to provide puncture or rupture resistance, the high density polyethylene is advantageously included.

Generally speaking, a useful melt index for a polyethylene resin blend in accordance with the present invention, depends in part upon the importance of toughness relative to detail. For a high degree of toughness, the melt index should not be below about 3.5 gm/10 min; for a high degree of detail, the melt index may be as much as about 8 gm/10 min. Particularly suitable for puncture or rupture resistance is a melt index in the range of about 4 to 6.5, especially about 5 to 6, gm/10 min. A further consideration is that a resin of relatively larger melt index value melts and lays down on the inside of the mold more rapidly and this beneficially reduces cycle time. Accordingly, the particular blend components and levels of individual components will be selected to obtain the desired effect.

A further essential component of a polyethylene-based composition in accordance with the present invention is a nucleating agent. A suitable nucleating agent advantageously has a melting point in excess of the melting point of the polyolefins or remains solid at the required molding temperature, and is typically of small particle size. Useful nucleating agents include mineral nucleating agents and pigments. Illustrative mineral nucleating agents include inorganic salts of Group 2A cations; sulfate salts; carbonate salts; and metal oxides including heavy metal dioxides. Exemplary specific mineral nucleating agents include calcium sulfate, barium sulfate, calcium carbonate and zinc oxide. Silicates such as kaolins, clays, talc, aluminum silicates and magnesium silicate will generally not be suitable. As may therefore be understood, a non-silicate salt of Group 2A cations will be used. Also unsuitable is sodium benzoate, which is well known for nucleating polypropylene for injection molding.

Illustrative pigment nucleating agents include titanium dioxide, carbon black, cobalt aluminum oxides such as cobalt blue, and chromium oxides such as chromium oxide green. Pigments such as ultramarine blue, which is a silicate, phthalocyanine blue and iron oxide red will typically not be suitable.

Typically, the nucleating agent will have a particle size in the range of from about 0.05 to 20 microns, preferably from about 0.1 to 10 microns. As may be understood, a finely powdered, nucleating agent will generally be used.

While not intending to be bound by the following theory, it may be that the nucleating agent in combination with the LLDPE polymer, is affecting crystalline structure, that a smaller, more uniform crystalline structure is being provided, and that improved elongation and tensile strength result therefrom. In combination with the nucleating agent and LLDPE polymer, the high density polyethylene may provide a stiffening effect to the medium density polyethylene for resistance against puncture or rupture. Examination of a polyethylene resin blend in accordance with the present invention, with and without titanium dioxide as the nucleating agent, has shown a smaller crystalline structure with nucleating agent present.

The amount of the nucleating agent to be used will vary depending upon factors including the nucleating agent selected, the particle size of the nucleating agent, and the intended effect. Generally speaking, a relatively better result may be obtained by use of a relatively higher level of the nucleating agent. Beneficially, at least about 0.1 to 3 parts, preferably about 1 to 2 parts, by weight of the nucleating agent may be used. Although in some cases an even higher level may be used, considerations including those of cost may dictate otherwise.

Other processing additives may be incorporated into the polyolefins as needed or appropriate. These processing aids may include anti-oxidants, UV stabilizers and anti-static agents.

In accordance with the invention, a polyolefin-based, resin blend as previously described, is rotomolded. To this end, the resins and nucleating agent may be advantageously extrusion blended, pelletized and ground to a powder, typically of 35 mesh. A suitable extrusion blending temperature is about 400° F. Thereafter, the powder is placed inside a hollow mold, which is typically rotated on two axes and heated inside an oven.

By the process, the powder is heated for a sufficient time and at a temperature adequate to melt the thermoplastic constituents of the powder blend, during the rotomolding. The time and temperature used depend upon factors including the thickness of the part being rotomolded and thermal sensitivity of the constituents. As applied to a polyethylene resin blend in accordance with the present invention and a part thickness of about ⅛", an oven temperature setting ranging from about 550° to 650° F. for about 10 to 20 minutes will typically provide sufficient melting conditions.

In the illustrations that follow and throughout this description, all parts and percentages are weight percent unless otherwise specified.

In Table I, the polyolefin resins used are as shown. Also shown is the level of nucleating agent (titanium dioxide) and percentage of resin. The indicated ingredients are extrusion blended at a temperature of about 400° F., pelletized and ground to a powder of about 35 mesh.

TABLE I

| RUN | RESIN | TiO2 | PSI | TENSILE (YIELD) PSI | TENSILE (BREAK) % | ELONG. (Percent) | TENSILE CHANGE AT BREAK DART IMPACT | |
|---|---|---|---|---|---|---|---|---|
| 1 | 100% | MDP1 | 0 | 2940 | 2765 | 570 | −6 | Puncture |
| 2 | 99% | MDP1 | 1% | 3125 | 2160 | 530 | −30 | Puncture |
| 3 | 100% | HDPE | 0 | 4895 | 0 | 20 | −100 | Shatter |
| 4 | 99% | HDPE | 1% | 4655 | 0 | 25 | −100 | Shatter |
| 5 | 100% | LDPE | 0 | 1690 | 1955 | 450 | +16 | Puncture |
| 6 | 99% | LDPE | 1% | 1595 | 1625 | 300 | +2 | Puncture |
| 7 | 50% 50% | HDPE LDPE | 0 | 3110 | 2305 | 565 | −26 | Shatter |
| 8 | 50% 49% | HDPE LDPE | 1% | 3215 | 2460 | 620 | −23 | Shatter |
| 9 | 90% 10% | MDP1 LDPE | 0 | 2880 | 2475 | 540 | −14 | Puncture |
| 10 | 89% 10% | MDP1 LDPE | 1% | 2480 | 2870 | 625 | +16 | Puncture |
| 11 | 90% 10% | MDP1 HDPE | 0 | 3095 | 1635 | 330 | −47 | Puncture |
| 12 | 89% 10% | MDP1 HDPE | 1% | 3000 | 1935 | 275 | −36 | Puncture |
| 13 | 80% 10% 10% | MDP1 HDPE LDPE | 0 | 2495 | 2065 | 560 | −17 | Puncture |
| 14 | 79% 10% 10% | MDP1 HDPE LDPE | 1% | 2585 | 3005 | 795 | +16 | No Puncture |
| 15 | 80% 10% 10% | MDP2 HDPE LDPE | 0 | 2550 | 1975 | 525 | −22 | Puncture |
| 16 | 79% 10% 10% | MDP2 HDPE LDPE | 1% | 2465 | 3125 | 800 | +27 | No Puncture |

MDP1 is Esso 8460: Density - 0.939; Melt Index - 3.6 gm/10 minutes.
MDP2 is Phillips TR938: Density - 0.938; Melt index - 3.9 gm/10 minutes.
LDPE is Novacor 0118: Density - 0.918; Melt Index - 1.0 gm/10 minutes.
HDPE is Novacor 2910: Density - 0.962; Melt Index - 25 gm/10 minutes.
Dart Impact: −40.

TABLE II

| RUN | NUCLEATING AGENT | TENSILE (Yield) PSI | TENSILE (Break) PSI | ELONG. % | TENSILE CHANGE AT BREAK (Percent) |
| --- | --- | --- | --- | --- | --- |
| 1 | None | 2495 | 2065 | 560 | −17 |
| 2 | 1% Sodium Benzoate | 2560 | 0 | 75 | −100 |
| 3 | 1% Barium Sulfate | 2585 | 3115 | 850 | +20 |
| 4 | 1% Calcium Sulfate | 2525 | 3205 | 870 | +27 |
| 5 | 1% Calcium Carbonate | 2585 | 3005 | 800 | +16 |
| 6 | 1% Zinc Oxide | 2545 | 3240 | 845 | +27 |
| 7 | 1% Titanium Dioxide | 2585 | 3005 | 795 | +16 |
| 8 | 0.4% Carbon Black | 2630 | 3265 | 910 | +24 |
| 9 | 1% Cobalt Blue | 2715 | 3225 | 860 | +19 |
| 10 | 1% Chromium Oxide Green | 2675 | 3260 | 855 | +22 |

RESIN:
79% 8460 Density - 0.939; Melt Index - 3.6 gm/10 minutes.
10% 2910 Density - 0.962; Melt Index - 25.0 gm/10 minutes.
10% 821N Density - 0.921; Melt Index - 0.8 gm/10 minutes.

Test Boxes were Roto Molded for 20 minutes at 600° F. Test specimens were die cut from the molded boxes.

The powder is charged inside a mold, and the mold is heated for about 17 minutes in an oven at a temperature of about 600° F. The rotomolding is on two axes as follows: about 12 rpm on axis #1 and about 6 rpm on axis #2. After the rotomolding and after cooling, a hollow molded part having a wall thickness of about ⅛" is removed from the mold.

Runs 1-9, 11-13 and 15 of Table I are comparative. Runs 10, 14 and 16 are for polyolefin resin blend compositions in accordance with the present invention. Novacor 0118 is an LLDPE. ASTM D638 is used for evaluating tensile strength and elongation, and the Arm Impact Test specified by the Association of Rotomolders, is used as the dart impact test. The results are shown in Table 1.

In Table 2, the polyolefin resin blend used is as shown. "8460" indicates the Esso 8460 used in Table 1; "2910" indicates the Novacor 2910 used in Table 1; and "821N" indicates Novacor 821N, an LLDPE resin. Also shown is the level of nucleating agent. The indicated ingredients are extrusion blended at a temperature of about 400° F., pelletized and ground to a powder of about 35 mesh. The powder is charged inside a mold, and the mold is heated for about 20 minutes in an oven at a temperature of about 600° F. Rotomolding is on two axes as before. After the rotomolding and after cooling, a hollow molded part having a wall thickness of about ⅛" is removed from the mold.

Runs 1 and 2 of Table 2 are comparative. The remaining Runs are for polyolefin resin blend compositions in accordance with the present invention. ASTM D638 is again used. The results are shown in Table 2.

The present invention may be carried out with various modifications without departing from the spirit or essential attributes thereof, and accordingly, reference should be made to the appended claims as indicating the scope of the invention.

I claim:

1. A rotomolding composition comprising a polyethylene resin blend comprising a minor portion of a linear low density polyethylene having a density in the range of about 0.915 to 0.925 gm/cc and a melt index of not more than about 12 gm/10 min, a major portion of a polyethylene having a density in the range of about 0.93 to 0.945 gm/cc and a melt index of from about 3 to 8 gm/10 min, and a minor portion of a relatively higher density polyethylene having a density in the range of about 0.950 to 0.965 gm/cc and a melt index of not less than about 15 gm/10 min, and an effective amount of a suitable nucleating agent to improve impact strength.

2. The rotomolding composition of claim 1, wherein said polyethylene having a density in the range of about 0.93 to 0.945 gm/cc, has a melt index of from about 3 to 5 gm/10 min.

3. The rotomolding composition of claim 1, wherein said linear low density polyethylene has a melt index of from about 0.8 to 2 gm/10 min.

4. The rotomolding composition of claim 1, wherein said relatively higher density polyethylene has a melt index of from about 15 to 30 gm/10 min.

5. The rotomolding composition of claim 1, wherein said nucleating agent is present in an amount of from about 0.1 to 3 parts by weight.

6. The rotomolding composition of claim 1, wherein said polyethylene having a density in the range of about 0.93 to 0.945 gm/cc, is present in an amount of at least 75 wt. %.

7. The rotomolding composition of claim 1, wherein said linear low density polyethylene and said relatively higher density polyethylene are each present in an amount ranging from about 5 to 20 wt. %.

8. The rotomolding composition of claim 1, wherein said nucleating agent is selected from an inorganic salt of Group 2A cations, a sulfate salt, a carbonate salt, a metal oxide, carbon black and cobalt blue, and mixtures thereof.

9. The rotomolding composition of claim 1, wherein said nucleating agent is selected from titanium dioxide, barium sulfate, calcium sulfate, calcium carbonate, zinc oxide, carbon black, cobalt blue, chromium oxide green, and mixtures thereof.

* * * * *